(12) United States Patent
Hayashi et al.

(10) Patent No.: US 8,005,906 B2
(45) Date of Patent: *Aug. 23, 2011

(54) CONTEXTUAL MOBILE LOCAL SEARCH BASED ON SOCIAL NETWORK VITALITY INFORMATION

(75) Inventors: Nathanael Joe Hayashi, Piedmont, CA (US); Edward Stanley Ott, IV, Palo Alto, CA (US); Audrey Y. Tsang, San Francisco, CA (US); Matthew Fukuda, San Francisco, CA (US); Daniel James Wascovich, San Francisco, CA (US); Michael Quoc, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 179 days.

This patent is subject to a terminal disclaimer.

(21) Appl. No.: 12/117,575

(22) Filed: May 8, 2008

(65) Prior Publication Data

US 2008/0208973 A1    Aug. 28, 2008

Related U.S. Application Data

(63) Continuation of application No. 11/380,868, filed on Apr. 28, 2006, now Pat. No. 7,636,779.

(51) Int. Cl.
*G06F 15/16* (2006.01)
(52) U.S. Cl. ......... 709/206; 709/207; 709/203; 709/217
(58) Field of Classification Search .................. 709/206, 709/207, 217, 203
See application file for complete search history.

(56) References Cited

U.S. PATENT DOCUMENTS

| | | | |
|---|---|---|---|
| 5,835,087 A | 11/1998 | Herz et al. | |
| 5,950,193 A | 9/1999 | Kulkarni | |
| 5,996,006 A | 11/1999 | Speicher | |
| 6,029,141 A | 2/2000 | Bezos et al. | |
| 6,175,831 B1 | 1/2001 | Weinreich et al. | |
| 6,269,369 B1 | 7/2001 | Robertson | |
| 6,327,573 B1 | 12/2001 | Walker et al. | |
| 6,343,317 B1 | 1/2002 | Glorikian | |
| 6,356,879 B2 | 3/2002 | Aggarwal et al. | |

(Continued)

OTHER PUBLICATIONS

"A Sneak Preview of the Christian Connection Matchmaker Match Page", http://web.archive.org/web/19990223221053/www.christian.matchmaker.com/ppmatch, Feb. 23, 1999.

(Continued)

*Primary Examiner* — Kristie D Shingles
(74) *Attorney, Agent, or Firm* — Frommer Lawrence & Haug LLP; John W. Branch (57) ABSTRACT

A system, apparatus, and method are directed to managing contextual based mobile searches. A context oriented user interface interprets inputs from a mobile user based on vitality information. In one embodiment, the input may be interpreted as a request to perform a context-based search over a network using at least some of the vitality information. Vitality information may include a location of the mobile device, a time of day, an event, information from the mobile user's calendar, past behavior of the mobile user, weather, social networking data, aggregate behaviors, or even information about proximity of a social contact. By employing vitality information to perform a mobile search, better search results and a richer user experience may be provided that includes a sense of community, a sense of presence (e.g., a sense of "here-ness."). In one embodiment, the mobile user may provide comments to others regarding the search results.

19 Claims, 7 Drawing Sheets

U.S. PATENT DOCUMENTS

| | | | |
|---|---|---|---|
| 6,433,795 | B1 | 8/2002 | MacNaughton et al. |
| 6,449,344 | B1 | 9/2002 | Goldfinger et al. |
| 6,466,917 | B1 | 10/2002 | Goyal et al. |
| 6,606,657 | B1 | 8/2003 | Zilberstein et al. |
| 6,714,931 | B1 | 3/2004 | Papierniak et al. |
| 6,745,178 | B1 | 6/2004 | Emens et al. |
| 6,879,994 | B1 | 4/2005 | Matsliach et al. |
| 7,013,326 | B1 * | 3/2006 | Suzuki et al. ............... 709/204 |
| 7,069,308 | B2 | 6/2006 | Abrams |
| 7,096,030 | B2 | 8/2006 | Huomo |
| 7,190,960 | B2 * | 3/2007 | Wilson et al. ............. 455/456.1 |
| 7,203,502 | B2 * | 4/2007 | Wilson et al. ............. 455/456.2 |
| 7,236,976 | B2 * | 6/2007 | Breitenbach et al. ......... 707/100 |
| 7,243,130 | B2 * | 7/2007 | Horvitz et al. ............... 709/207 |
| 7,299,222 | B1 | 11/2007 | Hogan et al. |
| 7,343,365 | B2 | 3/2008 | Farnham et al. |
| 7,359,688 | B2 | 4/2008 | Seo et al. |
| 7,359,894 | B1 | 4/2008 | Liebman et al. |
| 7,468,729 | B1 | 12/2008 | Levinson |
| 7,484,176 | B2 | 1/2009 | Blattner et al. |
| 7,496,623 | B2 * | 2/2009 | Szeto et al. .................. 709/203 |
| 7,532,900 | B2 * | 5/2009 | Wilson et al. ............. 455/456.3 |
| 7,533,083 | B2 * | 5/2009 | Aoki et al. ........................ 707/3 |
| 7,669,135 | B2 * | 2/2010 | Cunningham et al. ........ 715/758 |
| 7,685,530 | B2 * | 3/2010 | Sherrard et al. .............. 715/764 |
| 7,689,556 | B2 * | 3/2010 | Garg et al. ....................... 705/10 |
| 7,707,520 | B2 * | 4/2010 | Ashtekar et al. ............. 715/855 |
| 7,721,216 | B2 * | 5/2010 | Zaner et al. ................... 715/758 |
| 2002/0023132 | A1 | 2/2002 | Tornabene et al. |
| 2002/0023230 | A1 | 2/2002 | Bolnick et al. |
| 2002/0046259 | A1 | 4/2002 | Glorikian |
| 2002/0116466 | A1 | 8/2002 | Trevithick et al. |
| 2002/0124053 | A1 | 9/2002 | Adams et al. |
| 2003/0050977 | A1 | 3/2003 | Puthenkulam et al. |
| 2003/0167324 | A1 | 9/2003 | Farnham et al. |
| 2004/0088315 | A1 | 5/2004 | Elder et al. |
| 2004/0088322 | A1 | 5/2004 | Elder et al. |
| 2004/0088325 | A1 | 5/2004 | Elder et al. |
| 2004/0122681 | A1 | 6/2004 | Ruvolo et al. |
| 2004/0122803 | A1 | 6/2004 | Dom et al. |
| 2004/0122855 | A1 | 6/2004 | Ruvolo et al. |
| 2004/0162830 | A1 | 8/2004 | Shirwadkar et al. |
| 2004/0185885 | A1 * | 9/2004 | Kock ............................ 455/466 |
| 2004/0215793 | A1 | 10/2004 | Ryan et al. |
| 2005/0172001 | A1 * | 8/2005 | Zaner et al. ................... 709/205 |
| 2005/0221807 | A1 * | 10/2005 | Karlsson et al. .............. 455/418 |
| 2006/0074883 | A1 | 4/2006 | Teevan et al. |
| 2006/0170945 | A1 * | 8/2006 | Bill .............................. 358/1.13 |

OTHER PUBLICATIONS

"A Sneak Preview of the Christian Connection Matchmaker Search Page", http://web.archive.org/web/19990508232314/www.christian.matchmaker.com/ppsearch, May 8, 1999.

"FAQs About the ZeroDegrees Service," visited on Sep. 8, 2004, <http://www.zerodegrees.com/faq.htm>.

"The Purpose Principles and Process", http://web.archive.org/web/19990224045035/www.christian.matchmaker.com/process, Feb. 24, 1999.

"Welcome to the Christian Connection Matchmaker," http://web.archive.org/web/19990222170152/http://www.Christian.email.net/index/html, Feb. 22, 1999.

"Welcome to the Christian Connection Matchmaker" http://web.archive.org/web/19990221092342/www.christian.matchmaker.com/main, Feb. 21, 1999.

"Yahoo! Groups-What is the spam policy in Yahoo! Groups? How do I avoid spam?", http://web.archive.org/web/20021024130230/help.yahoo.com/help/us/groups/groups-05.html, Oct. 24, 2002.

"Yahoo! Groups-What is a Group?", http://web.archive.org/web/20021103223155/www.yahoo.com/r/ub, Nov. 3, 2002.

"Yahoo! Groups-Getting Started, Groups Account, Groups Features", http://web.archive.org/web/20021017061719/ http://help.yahoo.com/help/groups, Oct. 17, 2002.

Cranor, L. F. et al., "Spam," Communications of the ACM, 41(8):74-83, Aug. 1998.

Dragan, R. V., "Tribe.net (beta)," PC Magazine, <http//:www.pcmag.com/article2/0,1759,1418688,00.asp>, Jan. 20, 2004.

Ethier, J., "Current Research in Social Network Theory," <http://upaya.soc.neu.edu/archive/students/Ethier-SocialNetworks.html>.

Hines, M., "America Online proposes Love.com," http://news.com.com/2100-1032-5118986.html, Dec. 10, 2003.

Hines, M., "AOL serves up software for BREW", <http://news.com.com/2100-1038-5117686.html>, Dec. 9, 2003.

Jordan et al., "The Augmented Social Network: Building identity and trust into the next-generation internet", first monday Peer-Reviewed Journal on the Internet, www.firstmonday.dk/issues/issue8_8/jordan/, pp. 1-62.

Matchmaker.com Disclaimer, http://web.archive.org/web/20000420114350/www.Christian.matchmaker.com/rules, Apr. 20, 2000.

Member site Selection Page for Matchmaker.com, http://web.archive.org/web/19990219183131/matchmaker.com/newtry.shtml, Feb. 19, 1999.

Merrick, A., "The Best Way to . . . Find a Date—Ok, so true love isn't guaranteed; But there are ways to better the odds", Wall Street Journal, New York, NY, p. 1-5, ProQuest ID 64669169, Nov. 27, 2000.

Mullaney, T. J., "Diller's Latest Little Bet on the Net", BusinessWeek Online, <http://www.businessweek.com/print/technology/content/mar2004/tc20004031_2820_tc119.h . . . >, Mar. 1, 2004.

Myspace.com, "Home Page", http://www.myspace.com.

Myspace.com, "About Us", http://www.myspace.com/Modules/Common/Pages/AboutUs.aspx.

"Mobile Phone Technology Opens up New Revenue Streams," Zi Corporation White Paper, pp. 1-5, May 2005.

"Qix Benefits," Zi Corporation, http://www.zicorp.com/QixBenefits.htm.

"Qix Functions," Zi Corporation, http://www.zicorp.com/QixFunctions.htm.

Office Communication mailed Jul. 8, 2009, for U.S. Appl. No. 11/380,868, filed Apr. 28, 2006, 20 pgs.

Office Communication mailed Jun. 15, 2009, for U.S. Appl. No. 11/380,868 filed Apr. 28, 2006.

Office Communication mailed Feb. 20, 2009, for U.S. Appl. No. 11/380,868 filed Apr. 28, 2006.

Office Communication mailed Aug. 19, 2008, for U.S. Appl. No. 11/380,868 filed Apr. 28, 2006.

International Search Report and Written Opinion for International Application No. PCT/US07/66816, mailed on Aug. 6, 2008.

International Preliminary Report on Patentability for International Application No. PCT/US07/66816, mailed on Nov. 6, 2008.

Office Communication mailed on May 12, 2010 for China Patent Application No. 200780015463.3, filed on Apr. 18, 2007.

Office Communication mailed on Jan. 6, 2010 for Korea Patent Application No. 9-5-2010-000702488, filed on Apr. 18, 2007.

* cited by examiner

CONTEXTUAL MOBILE LOCAL SEARCH BASED ON SOCIAL NETWORK VITALITY INFORMATION

CROSS-REFERENCE TO RELATED APPLICATIONS

This is a continuation of U.S. patent application Ser. No. 11/380,868, entitled "Contextual Mobile Local Search Based On Social Network Vitality Information," filed Apr. 28, 2006, claiming benefit under 35 U.S.C. §120 and 37 C.F.R. §1.53 (b), of which is incorporated herein by reference.

FIELD OF THE INVENTION

The present invention relates generally to mobile search and, more particularly, but not exclusively to performing contextual mobile searches based, at least in part, on social networking information, including vitality information for a social network.

BACKGROUND OF THE INVENTION

Tremendous changes have been occurring in the Internet that influence our everyday lives. For example, online social networks are the new meeting grounds. They have been called the new power lunch tables and new golf courses for business life in the U.S. Moreover, many people are using such online social networks to reconnect themselves to their friends, their neighborhood, their community, and the world.

The development of such online social networks touch countless aspects of our everyday lives, providing instant access to people of similar mindsets, and enabling us to form partnerships with more people in more ways than ever before.

However, as social networking transforms our lives, many businesses continue to struggle to keep up, and provide value to the consumer in such a structure. Without the ability to extend value to a consumer's online experience, consumer loyalty to a business may quickly diminish. Thus, many businesses are searching for new ways to integrate social networking into their online business models with features that appeal to the consumer, while making a profit. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION OF THE INVENTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "social network" and "social community" refer to a concept that an individual's personal network of friends, family colleagues, coworkers, and the subsequent connections within those networks, can be utilized to find more relevant connections for a variety of activities, including, but not limited to dating, job networking, service referrals, content sharing, like-minded individuals, activity partners, or the like.

An online social network typically comprises a person's set of direct and/or indirect personal relationships, including real and virtual privileges and permissions that users may associate with these people. Direct personal relationships usually include relationships with people the user can communicated with directly, including family members, friends, colleagues, coworkers, and other people with which the person has had some form of direct contact, such as contact in person, by telephone, by email, by instant message, by letter, or the like. These direct personal relationships are sometimes referred to as first-degree relationships. First-degree relationships can have varying degrees of closeness, trust, and other characteristics.

Indirect personal relationships typically include relationships through first-degree relationships to people with whom a person has not had some form of direct or limited direct contact, such as in being cc'd on an e-mail message, or the like. For example, a friend of a friend represents an indirect personal relationship. A more extended, indirect relationship might be a friend of a friend of a friend. These indirect relationships are sometimes characterized by a degree of separation between the people. For instance, a friend of a friend can be characterized as two degrees of separation or a second-degree relationship. Similarly, a friend of a friend of a friend can be characterized as three degrees of separation or a third-degree relationship.

As used herein, "live" or a "live view" refers to providing of real-time or approximately real-time data. It is recognized that due to a variety of reasons, transfer of data over a network may be delayed by some varying amount of time. The delay may vary based on conditions of the network, configurations of the network, configuration of the sending and/or receiving device, or the like. Thus, live or a live view may range between real-time data transfers to some varying amount of time delay.

The term "vitality" as used herein refers to online and/or offline activities of a member of a social network. Thus, vitality information is directed towards capturing these aspects of a social community, through various communications between members, and their activities, states, and/or moods of various members, or the like. Vitality information may include, but is not limited to a location of the mobile device, weather information where the member is located, an event, information from the mobile user's calendar or even a friend's calendar, information from the mobile user's task list, past behavior of the mobile user and/or another member of the social network, the mobile user's preferences, a mood of a social network member, a mood of the mobile user, photographs, video files, audio files, internet links, information from a blog, an Really Simple Syndication (RSS) feed, Instant Messages (IMs), blog entries, emails, or the like, and even information about physical (e.g., geographical) proximity of the mobile user's social contacts, what the mobile user is doing at the moment in the real world, or the like. Vitality information however, is not limited to these examples, and other information that may describe the lively, open, or animated aspects of a social network may also be employed.

Moreover, the term "social networking information," includes vitality information. However, social networking information refers to both dynamic as well as less dynamic characteristics of a social network. Social networking information includes various profile information about a member, including, but not limited to the member's avatar, contact information, the member's preferences, degrees of separation between the member and another member, a membership in an activity, group, or the like, or the like.

Social networking information further may include various information about communications between the member and other members in the social network, including, but not limited to emails, SMS messages, IM messages, Multimedia Message (MMS) messages, alerts, audio messages, phone calls, either received or sent by the member, or the like.

Various "meta-data" may also be associated with the social networking information. Thus, for example, various permissions for access may be associated with at least some of the social networking information. Some access permissions (or sharing rules) may be selected, for example, based, in part, on an input by the member, while other access permissions may be defaulted based on other events, constraints, or the like. Briefly stated, the present invention is directed to a system, apparatus, and method that weave online social communities into a richer mobile experience for the mobile user, in part, by enabling contextual based mobile searches to be performed. Such contextual based mobile searches enable the mobile user to perform a search using, at least in part, vitality information from a social network.

Employing vitality information or other social networking information to perform a search provides a context to the search. That is, a search may be performed that accounts for where the mobile user may be physically located, what time of day the search is being performed, whether members of the mobile user's social network are nearby, aggregated information from other social networking members, what might be in the mobile user's calendar, task list, or the like.

The search may also take into account a mood of the mobile user, as indicated by the mobile user's avatar, an event, comment, or other input. The search may further take into account past behaviors of the mobile user, comments from members of the mobile user's social network, content of the mobile user's calendar, to do list, what activities the mobile user may be currently engaged in on the mobile device, or the like. By employing such social networking information to modify a search request the result of the search request may be made to become more relevant to the mobile user.

In one embodiment, the mobile device may employ a context-based application that may be configured to receive an input from the mobile user, and to interpret the input based, in part, on the vitality information or other social networking information. In one embodiment, based on the received input, the context-based application may provide the user with a list of actions that invoke a mobile application or a remote application, including a context-based search. The list of actions may change based on additional input from the mobile user. The user may select an application from the list for execution, provide additional input, or even select the context-based search to be performed. Furthermore, if the context-based search is performed, the mobile user may be enabled to provide comments to others within their social network regarding the results of the search to further enhance the mobile user's social experience.

Illustrative Operating Environment

Figure 1:
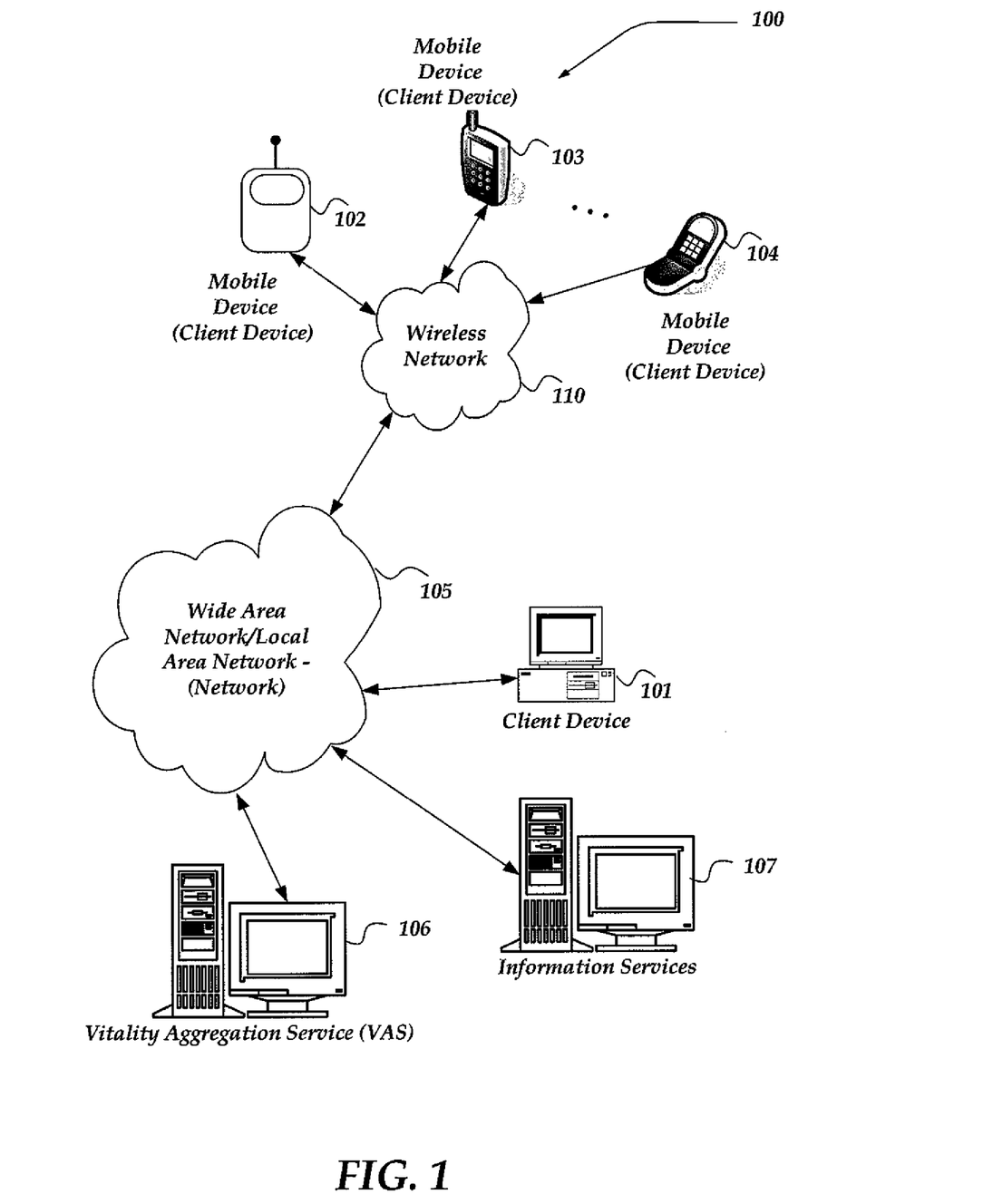
FIG. 1 is a system diagram of an environment in which the invention may be practiced.

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")–(network) 105, wireless network 110, Vitality Aggregation Service (VAS) 106, mobile devices (client devices) 102-104, client device 101, and information services 107.

One embodiment of mobile devices 102-103 is described in more detail below in conjunction with FIG. 2. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one other client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a message, or the like, sent to VAS 106, client device 101, or other computing devices. Moreover, mobile devices 102-104 may further provide information associated with its physical location to another computing device.

Mobile devices 102-104 may also be configured to communicate a message, such as through Short Message Service (SMS), Multimedia Message Service (MMS), instant messaging (IM), internet relay chat (IRC), Mardam-Bey's IRC (mIRC), Jabber, and the like, between another computing device, such as VAS 106, client device 101, or the like. However, the present invention is not limited to these message protocols, and virtually any other message protocol may be employed.

Mobile devices 102-104 may be further configured to enable a user to participate in communications sessions, such as IM sessions. As such, mobile devices 102-104 may include a client application that is configured to manage various actions on behalf of the client device. For example, the client application may enable a user to interact with the browser application, email application, IM applications, SMS application, and the like.

Mobile devices 102-104 may further be configured to include a client application that enables the end-user to log into an end-user account that may be managed by another computing device, such as VAS 106. Such end-user account, for example, may be configured to enable the end-user to receive emails, send/receive IM messages, SMS messages, access selected web pages, participate in a social networking activity, or the like. However, participation in various social networking activities may also be performed without logging into the end-user account.

In addition, mobile devices 102-104 may include another application that is configured to enable the mobile user to display and interact with various integrated live views that are configured based, in part, on the mobile user's social networking activities, experiences, and the like, including vitality information associated with the mobile user's social network. The integrated live views may be directed towards providing the mobile user with an integrated virtual 'hang-out' space for participating in various social events, including but not limited to sending/receiving photos between social networking members, 'chit-chatting' with members, blogging, sharing visual mood representations, sharing various messages, and generally participating in a variety of integrated social experiences beyond merely voice communications or text messages (e.g., IM). Moreover, such integrated live views enable the mobile user to configure highly personalized views and identities in virtual spaces within their social network.

Mobile devices 102-104 may also communicate with non-mobile client devices, such as client device 101, or the like. In one embodiment, such communications may include participation in social networking activities, including sharing of photographs, participating in determining how to spend time with other members, sending/receiving of messages, providing information based on physical proximity between members, or similar virtual hang-out activities.

In addition, mobile devices 102-104 may include a context oriented application or other component that is configured to interpret a mobile user's input based, in part, on social networking information, including vitality information. In one embodiment, the context oriented application may be integrated within a mobile operating system on the mobile device.

In one embodiment, the context oriented application may provide a list of applications based, in part, on a combination of social networking information, including vitality information, and the mobile user's input. For example, the mobile user may provide a sequence of numbers and/or alphanumeric characters that may be interpreted based on a physical location of the mobile device, a time of day, content of the mobile device's calendar, task list, a physical proximity between the mobile device and other members of the mobile user's social network, or the like. One embodiment of a use case illustrating such interpretation and use is described in more detail below in conjunction with FIG. 7. In any event, the mobile user may select one of the listed applications for execution, select a context based search to be performed based in part on the input, provide additional characters as input, or even perform some other action, such as exiting the mobile device, or the like.

Client device 101 may include virtually any computing device capable of communicating over a network to send and receive information, including social networking information, or the like. The set of such devices may include devices that typically connect using a wired or wireless communications medium such as personal computers, multiprocessor systems, microprocessor-based or programmable consumer electronics, network PCs, or the like. Moreover, client device 101, although representing a computing device that is non-mobile, may be configured to perform many of the actions described above for mobile devices 102-104. In addition, in at least one embodiment, client device 101 may also provide information, such as a MAC address, IP address, or the like, useable to determine its physical location.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile device s 102-104 and another computing device, network, and the like.

Network 105 is configured to couple VAS 106 and its components with other computing devices, including, mobile devices 102-104, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between VAS 106, client device 101, and other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of VAS 106 is described in more detail below in conjunction with FIG. 3. Briefly, however, VAS 106 may include any computing device capable of connecting to network 105 to enable aggregation and management of social networking information, including vitality information. VAS 106 may receive from various participants in a social network, information including information associated with activities, moods, events, messages, vitality information, communications, or the like. VAS 106 may also receive social networking information from a variety of other sources including, for example, information services 107. VAS 106 may store at least some of the received information for use by one or more social networking members. VAS 106 may also aggregate a portion of the received social networking information and enable one or more social networking members to receive and/or use at least a portion of the aggregated information, and other social networking information.

In one embodiment, VAS 106 may receive and manage a contextual based search request from mobile devices 102-104, or even from client device 101. VAS 106 may employ the stored social network information including vitality information, aggregate social networking information, or the like, in part, to provide a response to the search request. In one embodiment, VAS 106 may update at least some of the social networking information for use in performing the context based search. VAS 106 may then provide a context based search response to the requesting computing device.

Devices that may operate as VAS 106 include personal computers desktop computers, multiprocessor systems, microprocessor-based or programmable consumer electronics, network PCs, servers, and the like.

Although FIG. 1 illustrates VAS 106 as a single computing device, the invention is not so limited. For example, one or more functions of VAS 106 may be distributed across one or more distinct computing devices. For example, managing various social networking activities, including sharing of photographs, managing Instant Messaging (IM) session, SMS messages, email messages, sharing of contact information, aggregating and/or storing of social networking information, as well as performing the context based searches, may be performed by a plurality of computing devices, without departing from the scope or spirit of the present invention.

Information services 107 represents a variety of service devices that may provide additional information for use in generating live views on mobile devices 102-104. Such services include, but are not limited to web services, third-party services, audio services, video services, email services, IM services, SMS services, VOIP services, calendaring services, photo services, or the like. Devices that may operate as information services 107 include personal computers desktop computers, multiprocessor systems, microprocessor-based or programmable consumer electronics, network PCs, servers, and the like.

Illustrative Mobile Client Environment

Figure 2:
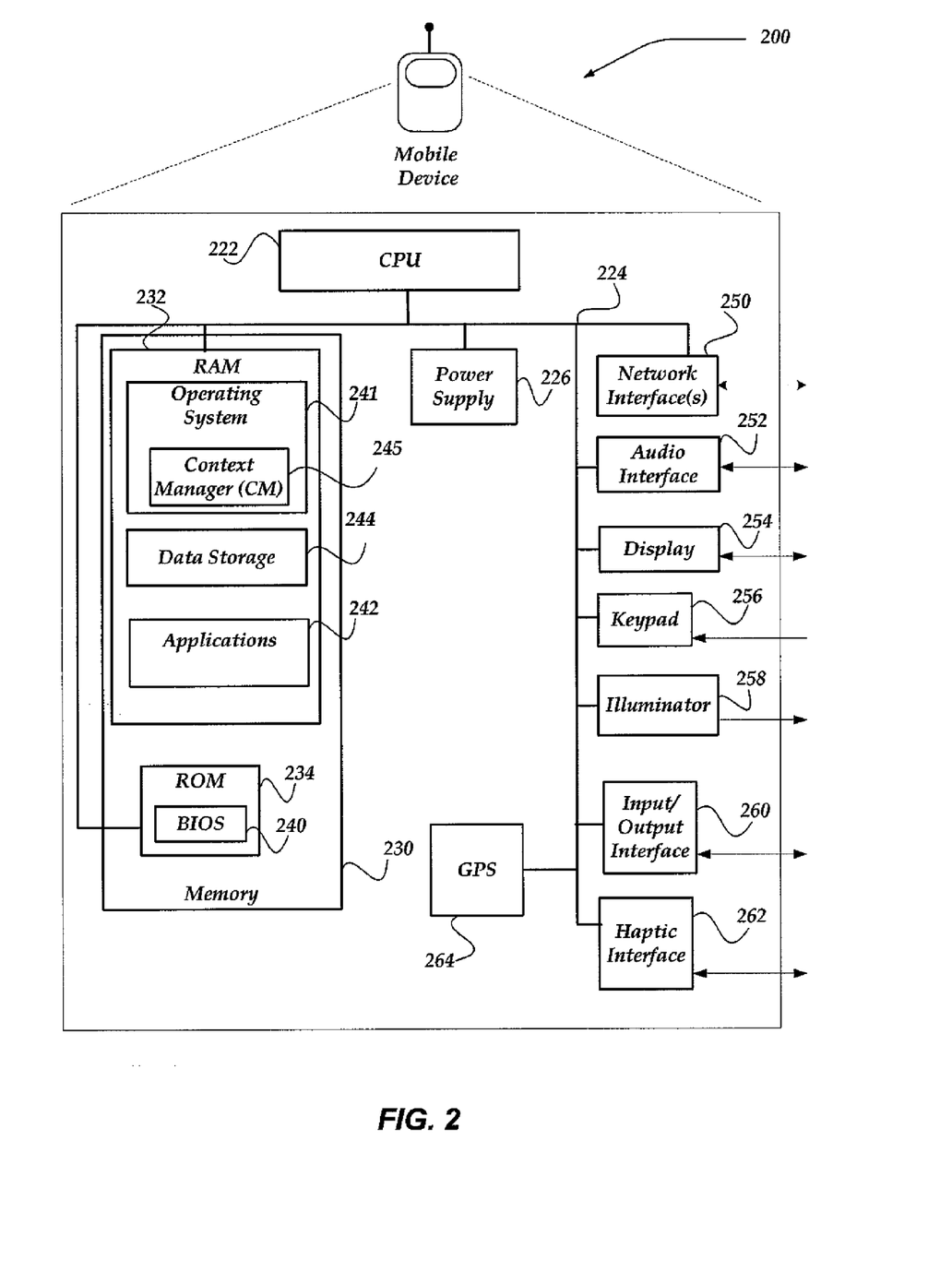
FIG. 2 shows one embodiment of a mobile device that may be included in a system implementing the invention.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, mobile devices 102-104 of FIG. 1.

As shown in the figure, mobile device 200 includes a processing unit (CPU) 222 in communication with a mass memory 230 via a bus 224. Mobile device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, mobile device 200 may, through other components, provide other information that might be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by mobile device 200 to store, among other things, applications 242 and/or other data. For example, data storage 244 may also be employed to store information that describes various capabilities of mobile device 200. The information may then be provided to another device based on any of a variety of events, including being sent as part of a header during a communication, sent upon request, or the like. Moreover, data storage 244 may also be employed to store social networking information including vitality information, or the like. At least a portion of the social networking information may also be stored on a disk drive or other storage medium (not shown) within mobile device 200.

Applications 242 may include computer executable instructions which, when executed by mobile device 200, transmit, receive, and/or otherwise process messages (e.g., SMS, MMS, IM, email, and/or other messages), audio, video, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, games, search programs, and so forth.

Operating system 241 may also include context manager 245. Although illustrated in FIG. 2 as a component of operating system 241, the invention is not so limited, and context manager 245 may also be implemented as one or more applications with applications 242, without departing from the scope or spirit of the invention.

Context manager 245 is a context oriented application that may be configured to receive an input from the mobile user, and to interpret the input based, in part, on vitality information or other social networking information. Based on a combination of social networking information, context manager 245 may enable a display of a list of applications, including a context based search application. As additional input is received, context manager 245 may modify the list of applications that is displayed.

The user of mobile device 200 may select for execution one of the applications from the list, provide additional input, select the context based search, or perform any of a variety of other actions, including, but not limited to exiting mobile device 200, dialing a telephone number based on the input, or the like.

If the mobile user selects to perform the context based search, a request may be provided to a network device. In one embodiment, the request includes the input from the mobile user along with social networking information, including perhaps, vitality information. Thus, in one embodiment, context manager 245 may modify the input to combine additional parameters to be used in performing the search. For example, context manager 245 may modify the search with such parameters as a physical location of mobile device 200, information from a calendar associated with mobile device 200, information for a task list, a contact list, aggregate social networking information, social networking information obtained from another computing device, such as VAS 106 of FIG. 1, or the like.

Context manager 245 may obtain at least a portion of the social networking information from data storage 244, and/or another storage medium on mobile device 200. Context manager 245 may also request social networking information from a networked device, such as VAS 106 of FIG. 1, or the like. In one embodiment, context manager 245 may also obtain social networking information, including vitality information from one or more applications within applications 242 to modify the search request.

Context manager 245 may provide the modified context based search request to another computing device, such as VAS 106, or the like. Context manager 245 may receive and display a context based response to the search request. In one embodiment, context manager 245, or another component, such as a browser application, or the like, may display the context based response to the search request. In one embodiment, the mobile user of mobile device 200 may be enabled to provide a comment to at least a portion of the context based response. Context manager 245 may employ at least a portion of a process such as described below in conjunction with FIG. 5 to perform at least some of its actions.

Illustrative Server Environment

Figure 3:
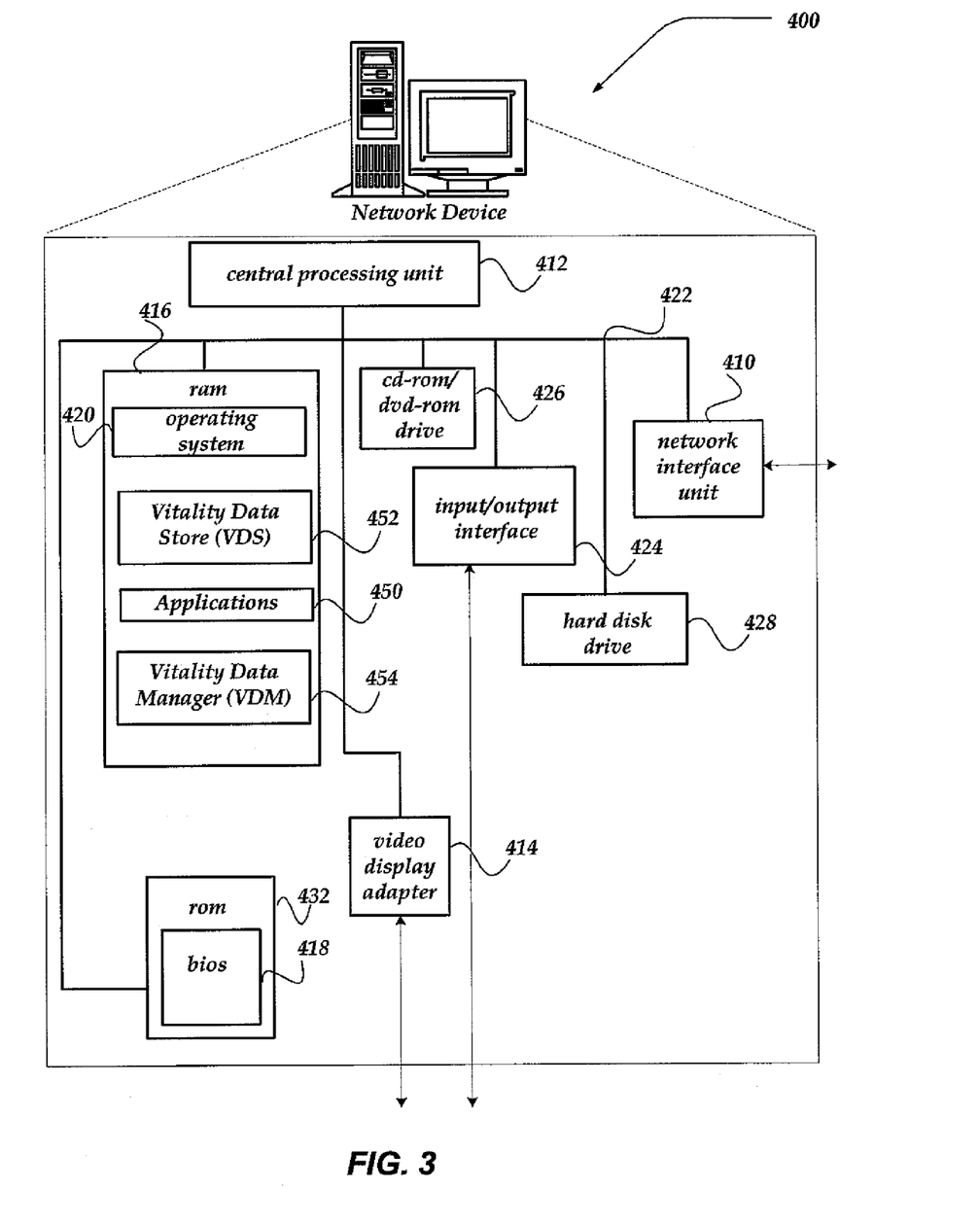
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, VAS 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, SMS message servers, IM message servers, email servers, account management and so forth. Vitality Data Manager (VDM) 354 may also be included as an application program within applications 350.

VDM 354 is configured to receive from a variety of sources information that may be associated with social networking activities of various social networking members. Such information may include but is not limited to various communications, including emails, SMS messages, IM messages, audio messages, VOIP messages, RSS feeds, membership information, calendar events, photo streams, photographs, blog updates, web pages, mood information, behaviors of social network members, or the like. VDM 354 may aggregate or otherwise combine at least some of the received information to generate aggregate vitality information such as a mood of a group, organization, or the like, group events, albums, aggregate music selections, tags, or the like. VDM 354 may store at least some of the received and/or aggregated information in Vitality Data Store (VDS) 352, which may be implemented as a database, a folder, program, or the like. VDM 354 may also distribute at least some of the received and/or aggregated information to one or more social networking members, such as mobile devices 102-104 and/or client device 101 of FIG. 1 or the like.

VDM 354 may further be configured to manage, at least in part, a context based search based on a received request. The received request may, in one embodiment, include social networking parameters, data, or the like, that is arranged to direct the search based on a social context, including various vitality aspects of the social context. Thus, the received search request may include parameters indicating a physical location of the requester, a calendar event, a task list item, a request to employ aggregate social networking information, or the like. In one embodiment, VDM 354 may update at least some of the social networking information to be used to perform the search. In one embodiment, VDM 354 may also combine the received social networking parameters, with additional social networking information. VDM 354 may then perform the search or direct another computing device to perform the search, or perform several searches based on the input and the social networking parameters. VDM 354 may, for example, perform at least a portion of the search on a database managed, at least in part, by VDM 354. VDM 354 may also perform the context based search using a variety of traditional search tools, known databases, the internet, or the like. VDM 354 may then provide a response to the searches to the requesting computing device. In one embodiment, at least a portion of the response may enable the requester to provide a comment on the context based search response. If the requester selects to provide a comment, VDM 354 may provide the comment to at least one other social networking member, aggregate the comment with other comments, incorporate the comment into a social networking database of comments, or the like. VDM 354 may employ processes such as described below in conjunction with FIGS. 4 and 6 to perform at least some of its actions.

Generalized Operation

Figure 4:
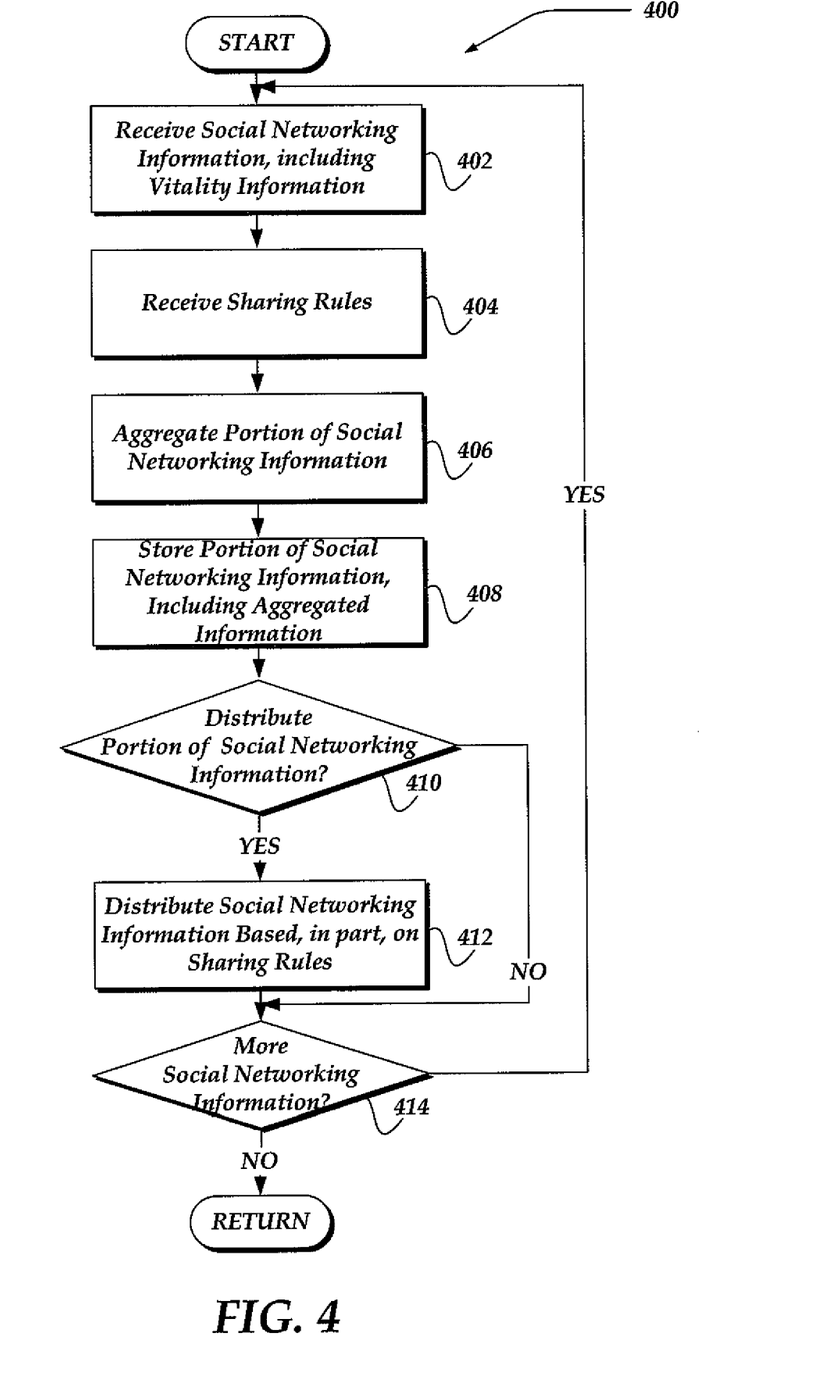
FIG. 4 illustrates a logical flow diagram generally showing one embodiment of a process for gathering and/or aggregating social networking information.

The operation of certain aspects of the invention will now be described with respect to FIGS. 4-7. FIG. 4 illustrates a logical flow diagram generally showing one embodiment of a process for gathering and/or aggregating social networking information. Process 400 of FIG. 4 may be implemented with VAS 106 of FIG. 1.

FIG. 4 illustrates a logical flow diagram generally showing one embodiment of a process for managing social networking information, including vitality information for social networking members. Process 400 of FIG. 4 may be implemented within VAS 106 of FIG. 1.

Process 400 begins, after a start block, at block 402, where social networking information, including vitality information is received from a variety of sources. In one embodiment, the social networking information may be received from a plurality of mobile devices, RSS services, IM services, email services, VOIP services, audio services, web services, graphics services, or the like. For example, a social networking member may provide a mood avatar, photograph, or information from a blog. In another example, a web service, or other service may provide photographs, audio files, or the like. In one embodiment, information may be received, absent a solicitation for the information. In another embodiment, a request for information may be sent to various services, mobile devices, client devices, or the like. The received information may include various vitality information including, but not limited to mood information, location information, IM or other communication status, information indicating a change in a blog status, or any of the other vitality information described above.

Processing then flows to block 404 where sharing rules are received. In one embodiment, a sending device may also employ sharing rules to determine whether to send particular vitality information. For example, a mobile user, or the like, may elect not to communicate their physical location. Therefore, such information might not be received for some social networking members. In another embodiment, sharing rules may be received prior to or even coincident with some portion of social networking information. For example, in one embodiment, a photo sharing service may send a selection of photographs, or the like, with sharing rules that indicate whether a social networking member may receive or otherwise access one or more of the photographs. Such sharing rules therefore, indicate which social networking member(s) may receive or otherwise access which portion of social networking information. Thus, sharing rules include various criteria, events, triggers, or the like.

Process 400 then flows to block 406 where based in part on the sharing rules, at least some of the received social networking information, including at least some of the vitality information may be aggregated, or otherwise combined. For example, where a predefined group of social networking members provide a mood identifier that indicates a similar mood, an aggregated mood might be generated for the group. As another example, where several social networking members have provided an opinion on a blog, a restaurant, an event, or the like, an aggregated opinion may be generated. Clearly, the invention, however, is not limited to these examples, and a variety of other received social networking information may be aggregated, without departing from the scope or spirit of the invention.

Processing then flows to block 408, where at least some of the received social networking information, including vitality information, and aggregated information may be stored. Storage of such information enables distribution at some other time, additional aggregation, and/or other analysis to be performed, or the like. However, storage of social networking information may be, in at least one embodiment, optional.

Flowing next to decision block 410, a determination is made whether to distribute at least a portion of the social networking information. Distribution may be performed based on a variety of criteria, including but not limited to, sending the information as soon as it is received, sending at least some of the information based on an event, time, or the like. For example, in one embodiment, some of the information may be distributed in real-time, while other information may be distributed based on an event, or the like. In any event, if distribution of social networking information is to occur, processing flows to block 412; otherwise, processing flows to decision block 414.

At block 412, the social networking information, including at least some aggregation information, is distributed to at least one mobile device, based on the received sharing rules. Processing then flows to decision block 414.

At decision block 414, a determination is made whether there is more social networking information to manage. If there is more social networking information to manage, processing branches back to block 402; otherwise, processing returns to a calling process to perform other actions.

Figure 5:
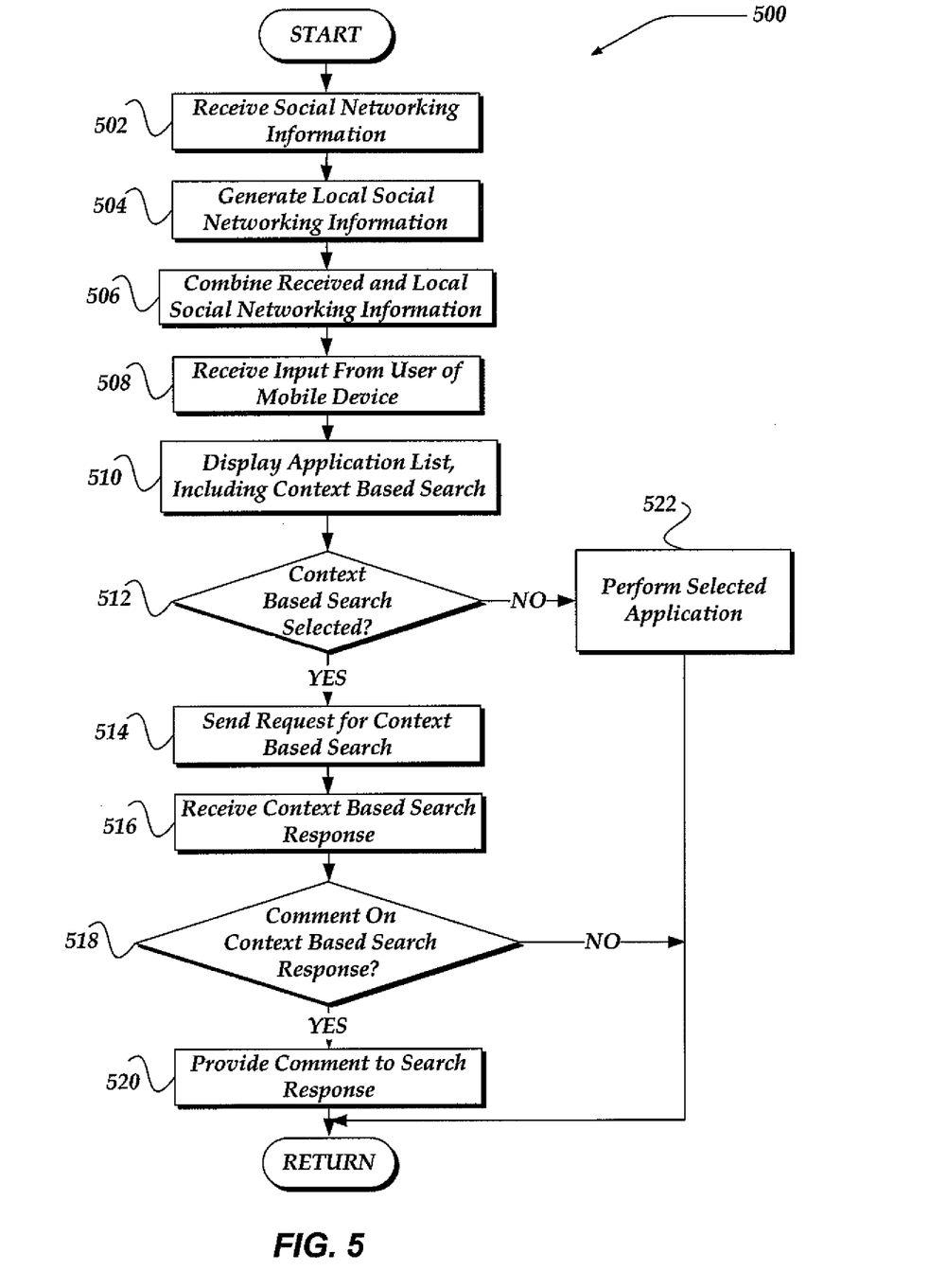
FIG. 5 illustrates a logical flow diagram generally showing one embodiment of a process for use by a mobile device in performing a context based search using vitality information.

FIG. 5 illustrates a logical flow diagram generally showing one embodiment of a process for use by a mobile device in performing a context based search using vitality information. Process 500 of FIG. 5 may, for example, be implemented with one of mobile devices 102-104 of FIG. 1. It is important to note, that while directed towards mobile devices, the invention is not so limited, and a 'stationary' computing device, such as client device 101 may also employ process 500, without departing from the scope or spirit of the invention.

Process 500 begins, after a start block, at block 502, where social networking information, including vitality information, is received. Such social networking information may include a variety of information, including, but not limited to, proximity information about members of a social network, aggregated social networking information, moods of members of the social network, information associated with degree of separation of members of the social network, preferences from at least some of the members of the social network, as well as social networking information mentioned above.

Processing flows next to block 504 where social networking information from the local mobile device may be generated. Such information may include, but is not limited to a physical location, a mood of the user of the mobile device, content of an application on the mobile device including calendars, task lists, contact lists, whether the mobile user has received or recently sent various messages including IM messages, email messages, and the like, to whom or from whom the messages were sent/received, as well as other local social networking information mentioned above. Such local social networking information is intended to be focused on describing the status, activities, behaviors, and the like, of the mobile user associated with the mobile device. Therefore, local social networking information may, for example, include information regarding what activities the mobile user may be associated with, as well as whether the mobile user is involved in stock activities, has a meeting, is at a party (as determined by content of the mobile user's calendar, and physical location), or the like.

Processing continues to block 506 where the received social networking information and the local social networking information may be combined. In one embodiment, the social networking information is also stored in a local data store. Combining the social networking information may be based on prior behaviors of the user of the mobile device, current physical location of the mobile device, contents of the mobile user's calendar, task list, or the like. At least some of the social networking information may be combined with other social networking information, be combined based on a weighed algorithm, or the like.

Figure 7:
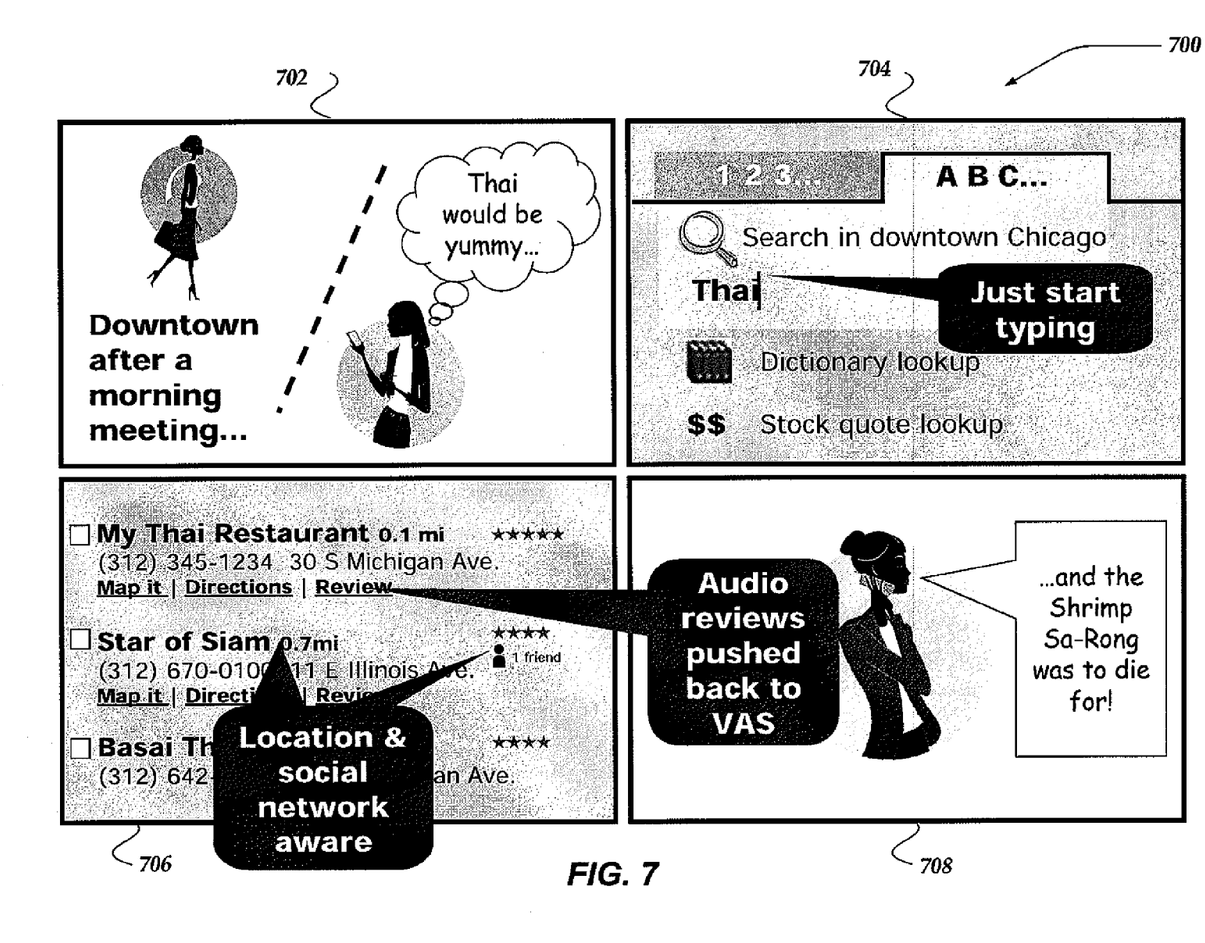
FIG. 7 shows one embodiment of a use case illustrating performing a context based search and providing a mobile review of a search result, in accordance with the present invention.

Process 500 moves next to block 508, where the mobile user may provide input to the mobile device, typically in the form of one or more characters. Typically, the mobile device may display a new screen to upon initial receipt of the input. Processing then flows to block 510, where the social networking information from at least blocks 502, 504, and 506 is employed to select for display a list of one or more applications, including a context based search application. FIG. 7 illustrates one embodiment of a list of applications that are displayed based on a social networking context.

Processing continues next to decision block 512, where a determination is made whether the mobile user has selected one of the applications within the list, selected to perform a context based search based on the input, provide additional input, or the like. If the mobile user selects to perform one of the applications within the list, processing flows to block 522. If the mobile user selects to perform the context based search, processing continues to block 514. Although not shown, the mobile user may also provide additional input, in which instance, the process may loop back to block 508. It is noted, that although not shown, the mobile user may also elect to exit the mobile device, select an application not on the list, or the like, without departing from the scope or spirit of the invention.

At block 522, the selected application may be performed. In one embodiment, at least some of the input may be employed by the selected application. Process 500 may then return to a calling process to perform other actions.

At block 514, however, a context based search request is generated based in part on the social networking information and the received input. In one embodiment, a set of search parameters may be generated based on the input and the social networking information. In one embodiment, the context based search request may be formed using a structured query language. In another embodiment, the context based search request may be formed based any of a variety of other formats, including an HTTP query search, a format for a particular web crawler application, database application, or the like. The context based search request may then be sent over the network to a computing device that may perform the search on behalf of the mobile device. Processing continues to block 516, where a context based search response may be received. In one embodiment, the context based search response may be prepared and provided by the other computing device using a process such as described below in conjunction with FIG. 6.

Processing continues to decision block 518, where mobile user may use the context based search response to perform a variety of actions. In one embodiment, the mobile user may receive a context based search response that may enable the mobile user to provide a comment, or similar input. If the user selects not to provide a response, processing may return to the calling process to perform other actions.

If the mobile user selects to provide a comment, processing flows to block 520 where the mobile user may prepare and send the comment. While the context based search response may be provided to the mobile user as a graphic, and/or text based response. The mobile user is not constrained to providing a comment in a similar format. Thus, for example, the mobile user may select to provide the comment as an audio response, SMS response, email, form response, or the like. In any event, processing may return to the calling process to perform other actions.

Figure 6:
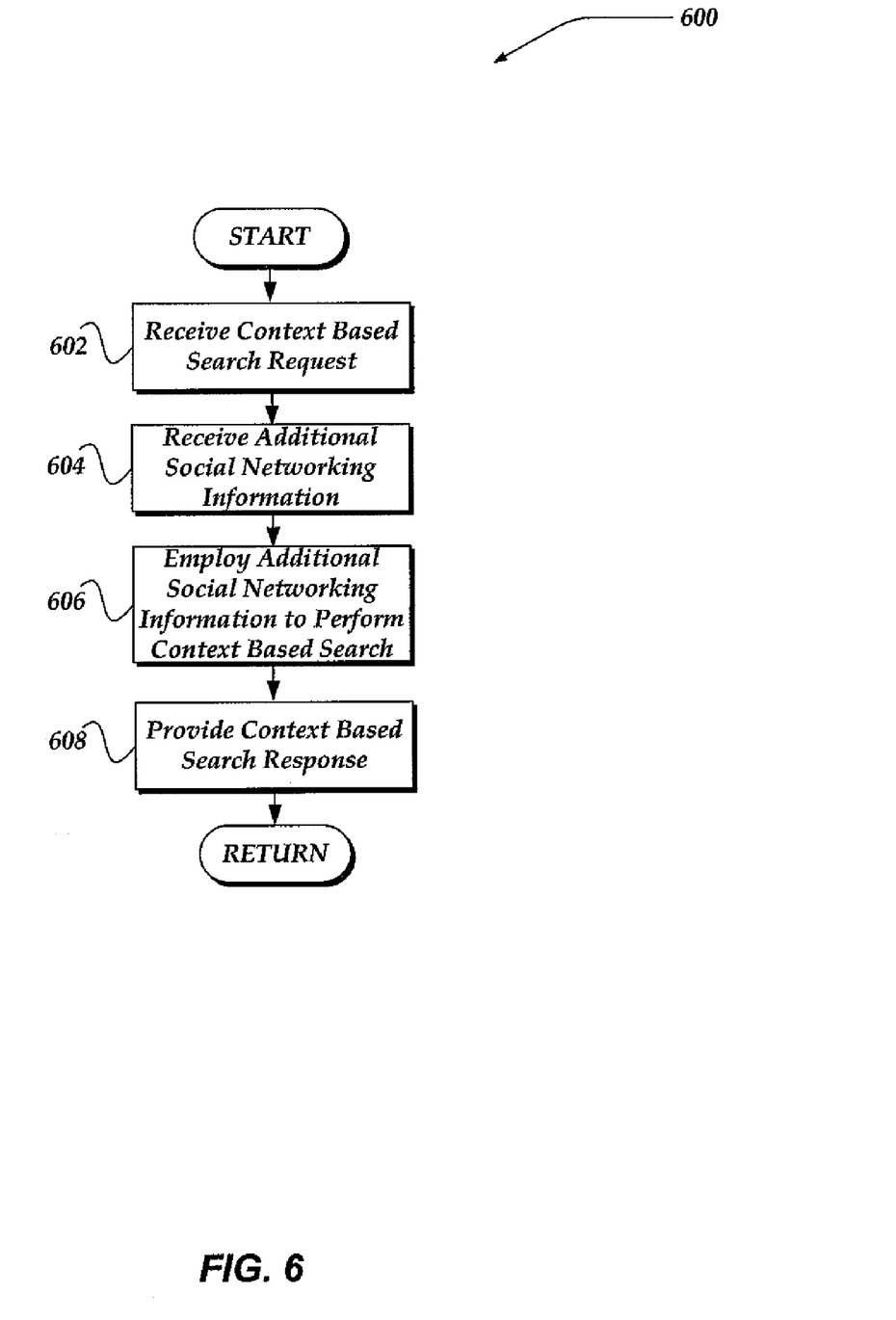
FIG. 6 illustrates a logical flow diagram generally showing one embodiment of a process for use by a network device in responding to a request for a context based search.

FIG. 6 illustrates a logical flow diagram generally showing one embodiment of a process for use by a network device in responding to a request for a context based search. Process 600 of FIG. 6 may be implemented, for example, within VAS 106 of FIG. 1.

Process 600 begins, after a start block, at block 602 where a context based search request, such as described above, is received.

Processing flows to block 604 where additional social networking information may also be received. Additional social networking information that is received enables the context based search to remain more current, and therefore, potentially more relevant to the requester. Thus, the additional social networking information may include whether selected members of the social network are currently within an IM conversation, email exchange, audio conversation, or the like. The additional information may also include any changes in selected member's calendars, task lists, physical location, or the like.

Processing then continues to block 606 where the additional social networking information may be employed to modify the received context based search request. The modified context based search request may then be performed to obtain a response. In one embodiment, the search request may be performed over the internet, an intranet, using at least one selected databases, or the like. In one embodiment, the search request may be performed using web crawlers. In one embodiment, the search request may be decomposed and provided as a plurality of search requests. In any event, a context based search response may be obtained. At block 608, the context based search response is provided to the requester. Processing then returns to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Illustrative Use Case

FIG. 7 shows one embodiment of a use case illustrating performing a context based search and providing a mobile review of a search result, in accordance with the present invention. As such, use case 700 of FIG. 7 may be used to illustrate one example of using the invention.

As shown in use case 700, the mobile user may determine that they may desire to participate in some event, such as a lunch event, party, meeting, or the like, as illustrated in block 702. The mobile device may, for this example, be location aware. That is, through GPS, or another location tracking mechanism, the mobile device may provide a physical location.

As shown in block 704, the mobile user may start to type characters into the display screen of their mobile device. It is important to note, however, that the invention is not constrained to how input is provided to the context oriented application. Thus, for example, the mobile user might be able to verbally dictate input, employ a touch screen, a stylus, or the like, to provide input.

In any event, as the input is received by the context oriented application, social networking information is employed to select and display a list of applications, including a search application. Selection of the list of application is based on usage of the social networking information as described above. Thus, in this example, the mobile user may have an item in their task list, calendar or the like, associated with stocks. For example, consider that the mobile user's calendar indicates that the mobile user is to have a meeting with their stock broker, or the like, in the afternoon. Thus, one of the applications that may appear is related to obtaining stock information. In addition, the social networking information may indicate that the mobile user is looking for a definition of a term that may be related with an item in their task list. Thus, a dictionary lookup application may also be provided. In addition, the search application may employ social networking information to recognize that the mobile user in physically located in downtown Chicago, has an hour or so for lunch, and typically eats at Thai restaurants when downtown. For this use case, the mobile user selects a Thai restaurant.

As seen in block 706, a list of possible restaurants is provided that indicate context based specific information. For example, as illustrated, a physical distance from the mobile user is provided, without requesting the mobile user to explicitly provide their location. Moreover, the list of possible restaurants may be ordered based on social networking information, such as which restaurants a friend, family member, close contact (first degree of separation), or the like has recommended. The list might also provide a review from a friend, family member, or the like. In addition, the list might be generated based on a variety of other social networking information, including perhaps how busy the restaurant may typically be, how much time the mobile user has available as indicated by their calendar, or the like.

Also, as illustrated, the list of restaurants may enable the mobile user to provide a review or other comment on the restaurant. Thus, as shown in block 708, the mobile user may provide a comment that may be provided back to another computing device, to be shared among the social network of the mobile user.

It is important to remember, that the above use case is merely an illustration of one of a myriad of other possible uses for context based search using social networking information to provide context based responses to a mobile user. Thus, FIG. 7 is not intended to limit the use or other aspects of the invention.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method to manage a search over a network, comprising:
    receiving, from a client device, vitality information that includes at least a location of the client device and a mood of a user of the client device;
    employing the vitality information including the location and a time of day associated with the client device to determine a social networking context;
    receiving, from a server device, social networking information that includes at least an aggregated mood of a predefined group of social networking members; and
    automatically selecting and displaying a list of applications based on the social networking information, including the aggregated mood for the group, the vitality information, and a user input, wherein the list of applications includes a contextual-search application that performs actions, including:
        while receiving portions of a search input request:
            performing a social networking context based search using the received portions of the search input request and the determined social networking context; and
            providing at least one result of the social networking context based search to the client device.

2. The method of claim 1, wherein while receiving portions of the search input request, further comprises:
    providing a list of one or more applications to the client device that are selected based on the determined social networking context and the received portion of the search input request.

3. The method of claim 1, wherein performing the social networking context based search further comprises modifying an input to a search application with the determined social networking context information.

4. The method of claim 1, wherein performing the social networking context based search using the received portions of the search input request further comprises using less than an entire search input request.

5. The method of claim 1, wherein providing at least one result of the social networking context based search further comprises providing a review of the at least one result, wherein the review is from at least one of a social networking contact within a first degree separation from the user of the client device.

6. The method of claim 1, wherein the vitality information further includes information from a calendar associated with the user of the client device, and wherein the determined social networking context is further determined based on the information from the calendar.

7. The method of claim 1, wherein the at least on result is ordered based on additional social networking information provided by at least one member of a social network associated with the user of the client device.

8. A non-transitory computer-readable non-volatile storage medium that includes data, wherein the execution of the data provides for the management of a mobile search over a network by enabling actions, including:

receiving vitality information that includes at least a location of a client device, a mood of a user of the client device, and information from a calendar associated with the user of the client device;

employing the vitality information including the location and calendar information to determine a social networking context;

receiving, from a server device, social networking information that includes at least an aggregated mood of a predefined group of social networking members; and automatically selecting and displaying a list of applications based on the social networking information, including the aggregated mood for the group, the vitality information, and a user input, wherein the list of applications includes a contextual-search application that performs actions, including:

while receiving portions of a search input request:
performing a social networking context based search using the received portions of the search input request and the determined social networking context; and
providing at least one result of the social networking context based search to the client device.

9. The computer-readable non-volatile storage medium of claim 8, wherein while receiving portions of a search input request further comprises:

providing a list of at least one application for use at the client device, wherein the at least one application is determined based on the determined social networking context and the received portions of the search input request.

10. The computer-readable non-volatile storage medium of claim 8, wherein the execution of the data provides actions, further including:

receiving a comment from the client device for at least one result; and sharing the received comment with a plurality of users within a social network associated with the user of the client device.

11. The computer-readable non-volatile storage medium of claim 8, wherein the information from a calendar further comprises information indicating activities by the user around a time of day.

12. The computer-readable non-volatile storage medium of claim 8, wherein the at least one result is ordered based on additional social networking information from a member of a social network associated with the user.

13. The computer-readable non-volatile storage medium of claim 8, wherein performing a social networking context based search using the received portions of the search input request and the determined social networking context further comprises:

receiving information about a feature of at least one result of the search; and modifying the search input request with the received information such that the at least one result of the search is further based on the received information.

14. A method for enabling a search over a network for a client device, comprising:

sending over the network, vitality information that includes at least a location of the client device, a mood of a user of the client device, and information from a calendar associated with the client device, wherein the vitality information is useable to determine a social networking context for the user of the client device;

collecting social networking information that includes at least an aggregated mood of a predefined group of social networking members; and automatically selecting and displaying a list of applications based on the social networking information, including the aggregated mood for the group, the vitality information, and a user input, wherein the list of applications includes a contextual-search application that performs actions, including:

while receiving portions of a search input request over the network, providing in response at least one result of a social networking context based search that is based on the received portions of the search input request combined with at least some of the determined social networking context information, including the location and calendar information.

15. The method of claim 14, wherein sending portion of the search input request further comprises sending less that the complete search input request comprising a text string.

16. The method of claim 14, wherein while sending portions of a search input request further comprises:

additionally sending a list of applications selected based on the sent portions of the search input request combined with at least some of the determined social networking context information; and enabling the user of the client device to select from the list of applications.

17. The method of claim 14, further comprising:

sending, over the network, a comment associated with the at least one result, wherein the comment is useable for another social networking context based search by another client device.

18. The method of claim 14, wherein the at least one result further includes at least one recommendation from a member of a social network associated with the user.

19. The method of claim 14, wherein the at least one result is ordered based on additional social networking information obtained from members within a first degree of separation from the user.

* * * * *

UNITED STATES PATENT AND TRADEMARK OFFICE
CERTIFICATE OF CORRECTION

| | |
|---|---|
| PATENT NO. | : 8,005,906 B2 |
| APPLICATION NO. | : 12/117575 |
| DATED | : August 23, 2011 |
| INVENTOR(S) | : Nathanael Joe Hayashi et al. |

It is certified that error appears in the above-identified patent and that said Letters Patent is hereby corrected as shown below:

In column 18, line 62, in Claim 7, delete "on" and insert -- one --, therefor.

In column 20, line 31, in Claim 15, delete "that" and insert -- than --, therefor.

Signed and Sealed this
Fifteenth Day of November, 2011

David J. Kappos
*Director of the United States Patent and Trademark Office*